United States Patent Office 3,264,268
Patented August 2, 1966

3,264,268
POLYURETHANES FROM HYDROXY ALKYLATED AROMATIC AMINES
Erwin Müller and Otto Bayer, Leverkusen, and Julius Peter, Buchmuhle, Germany, assignors to Farbenfabriken Bayer Aktiengesellschaft, Leverkusen Germany, a German corporation
No Drawing. Filed June 21, 1962, Ser. No. 204,083
Claims priority, application Germany, June 22, 1961, F 34,243
6 Claims. (Cl. 260—77.5)

This invention relates to polyurethane plastics and a method of preparing the same. More particularly, it relates to non-porous elastomeric polyurethane plastics which can be cross-linked utilizing formaldehyde and/or sulphur.

It has been heretofore known to prepare intermediate reaction products of linear organic compounds containing active hydrogen atoms which are reactive with —NCO groups, organic diisocyanates and hydroxy alkylated aromatic amines in accordance with German Patents 1,063,375 and 1,092,191. These intermediate products can then be converted into the cross linked condition with either formaldehyde, substances yielding formaldehyde and sulphur. Hyroxy alkylated amines used in accordance with this procedure include N-dihydroxy ethyl-m-toluidine and N-dihydroxy ethyl-3,5-xylidene. These compounds are generally hard plastics which cannot contain large quantities of fillers. Also, the breaking elongation and tensile strength of these products are as high as desired for many applications.

It is, therefore, an object of this invention to provide improved non-porous polyurethane plastics. It is still another object of this invention to provide an improved method of making non-porous polyurethane plastics. It is a further object of this invention to provide storage stable polyurethane intermediates which can be cross linked by utilizing formaldehyde or sulphur.

The foregoing objects and others which will become apparent from the following description are accomplished in accordance with this invention, generally speaking, by providing non-porous polyurethane plastics prepared by reacting an organic compound containing active hydrogen atoms which are reactive with —NCO groups and having a molecular weight of at least about 800 with an organic diisocyanate and an hydroxy alkylated aromatic amine having the formula

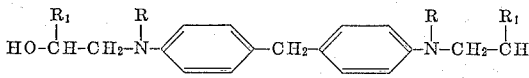

wherein R is an alkyl radical, a cycloalkyl radical or an aralkyl radical and $R_1$ is either a hydrogen atom or an alkyl radical to form an hydroxyl terminated storage stable intermediate and cross-linking this intermediate with either formaldehyde or sulphur. Thus, the invention contemplates the use of an hydroxy alkylated aromatic amine having the formula set forth to prepare an hydroxyl terminated storage stable polyhydric intermediate.

The final cross linked plastics prepared in accordance with this invention differ from the prior art products by having a lower hardness, a higher filling power, higher breaking elongation and tensile strength. The high filling power of these products makes possible the use of hydrophilic polyhydroxyl compounds such as polyethylene oxides for the formation of cross-linked plastics. Further, linear polyhydroxy compounds based on polypropylene oxide which has heretofore found very little use in the production of elastomeric homogeneous plastics, can be transformed into products with valuable properties.

In the preparation of the storage stable hydroxyl terminated intermediate, any suitable organic compound containing active hydrogen atoms which are reactive with —NCO groups and having a molecular weight of from at least about 800 and preferably from about 800 to about 2,000 may be used such as, for example, hydroxyl polyesters, polyhydric polyalkylene ethers, polyhydric polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, amylene glycol, hexanediol, bis-(hydroxy-methylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of an amino alcohol with any of the compositions set forth for preparing polyesters. Any suitable amine may be used such as, for example, ethylene diamine, propylene diamine, tolylene diamine, and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

It is preferred to use as the active hydrogen containing compound linear polyhydric polyalkylene ethers such as, polyethylene oxide and polypropylene oxides having a molecular weight of about 1,000. These active hydrogen compounds can be used directly or after an initial lengthening with diisocyanates to a molecular weight of from about 2,000 to about 3,000. Further any of the suitable polyhydroxy compounds set forth in the above mentioned German patents may be used.

Any suitable organic polyisocyanate may be used in the preparation of the caulking composition in accordance with this invention, such as, for example:

ethylene diisocyante,
ethylidene diisocyanate,
propylene diisocyanate,
butylene diisocyanate,
hexamethylene diisocyanate,
cyclopentylene-1,3-diisocyanate,
cyclohexylene-1,4-diisocyanate,
cyclohexylene-1,2-diisocyanate,
2,4-toluylene diisocyanate,
2,6-toluylene diisocyanate,
4,4'-diphenylmethane diisocyanate,
2,2-diphenylpropane-4,4'-diisocyanate,
p-phenylene diisocyanate,
m-phenylene diisocyanate,
xylylene diisocyanate,
1,4-naphthylene diisocyanate,
1,5-naphthylene diisocyanate,
diphenyl-4,4'-diisocyanate,
azobenzene-4,4'-diisocyanate,
diphenylsulphone-4,4'-diisocyanate,
dichlorohexamethylene diisocyanate,
furfurylidene diisocyanate,
1-chlorobenzene-2,4-diisocyanate and the like.

It is preferred that aromatic diisocyanates be used and for best results, 4,4'-diphenylmethane diisocyanate or toluylene diisocyanate have proven to be especially suitable.

The diphenylmethane derivatives having the formula set forth above can be prepared by reacting alkylene oxides with secondary 4,4'-diamino diphenyl methanes. Any suitable alkylene oxide may be used such as, for example, ethylene oxide, propylene oxide and the like. Any suitable secondary 4,4'-diamino diphenyl methane may be used such as, for example, N,N'-dimethyl 4,4'-diaminodiphenyl methane, N,N'-diethyl 4,4'-diaminodiphenyl methane, N-isopropyl N'-hexyl-4,4'-diamino diphenyl methane, N,N'-cyclohexyl-4,4'-diaminodiphenyl methane, N,N'-dibenzyl-4,4'-diaminodiphenyl methane and the like.

In the formula of the hydroxy alkylated aromatic amine represented above, R may be any alkyl radical such as, for example, methyl, ethyl, n-propyl, isopropyl, n-butyl, isobutyl, sec-butyl, t-butyl, n-amyl and the various positional isomers thereof, the corresponding straight and branched chain isomers of hexyl, heptyl, octyl, nonyl, decyl and the like; cycloalkyl such as, for example, cyclopropyl, cyclobutyl, cyclopentyl, cyclohexyl, cycloheptyl, cyclooctyl and the like; aralkyl radicals such as, for example, benzyl, α-phenyl ethyl, β-phenyl ethyl, α-phenyl propyl, β-phenyl propyl, gamma-phenyl propyl, α-phenyl isopropyl, β-phenyl isopropyl, α-phenyl butyl, β-phenyl isobutyl, α-phenyl sec-butyl, α-naphthyl methyl, β-naphthyl methyl and the like. $R_1$ is either hydrogen or any of the alkyl radicals set forth above with respect to the radical R. The hydroxy alkylated aromatic amines in accordance with the formula set forth are preferably used in quantities of from about 1 to about 20% by weight based on the weight of the organic compound containing active hydrogen atoms.

The isocyanate modified polyhydroxy compounds can be prepared in the manner set forth in German Patents 1,063,375 and 1,092,191. The components, that is, the active hydrogen containing compound, the diisocyanate and the hydroxy alkylated aromatic amine can also be reacted in admixture with one another. It is also possible to first react the active hydrogen containing compound with the diisocyanate and thereafter to react the products thus formed with the other components. The quantity of the diisocyanate used in this case is chosen such that after completion of the reaction, products free of —NCO groups are obtained. The reaction can further be carried out in the presence of catalysts for the —NCO-hydroxyl reaction such as, for example, tertiary amines and tin compounds such as dibutyl tin dilaurate. Any of the catalysts set forth in an article entitled, "Catalysis of the Isocyanate-Hydroxyl Reaction" by J. W. Britain et al. published in the Journal of Applied Polymer Science, volume IV, Issue No. 11 (1960) may be used.

The thermoplastic products thus formed can be stored and subsequently worked on rollers similar to those found in the rubber industry. While on the rollers, formaldehyde or compounds yielding formaldehyde such as, for example, dimethylol urea, 2-methyl tetra-amine, n-methylol urethanes, p-formaldehyde, hemi-acetals of ethylene glycol and diethylene glycol, hexamethylol melamine and their methylol ethers, and the like are incorporated. The millable material is then cross linked with shaping into the desired final configuration at temperatures of about 130 to about 170° C. Acid catalysts can be added such as, for example, inorganic or organic acids or compounds splitting off acids, acid salts, zinc chloride or complex salts of zinc chloride and the like. These compounds can be either added simultaneously with or subsequently to the formaldehyde.

If the vulcanization of the thermoplastic product is to be affected with sulphur, the operation is carried out in the presence of vulcanization accelerators known for vulcanizing rubber such as, for example, 2-mercapto benzthiozol, 2-mercapto benzthiazyl disulphide, the zinc chloride complex thereof and the like.

The invention will be further illustrated by the following examples in which parts are by weight unless otherwise specified.

*Example 1*

(a) About 5 kg. of a linear polypropylene ether having an hydroxyl number of 112, are dehydrated for about 2 hours at about 130° C./12 mm. and then about 435 g. of an isomeric mixture of about 70 parts of toluylene-2,4-diisocyanate and 30 parts of toluylene-2,6-diisocyanate are added dropwise thereto at about 90° C. and thereafter heated for about 1 hour to from about 120 to about 130° C. The product obtained by the process has an hydroxyl number of 50.

(b) About 100 g. of melted 4,4'-di-(N-methyl-β-hydroxyethyl-amino)-diphenylmethane are incorporated by stirring into about 1 kg. of the above reaction product at about 70° C. and thereafter about 148 g. of toluylene diisocyanate are added. After adding about 0.25 cc. of dibutyl-tin dilaurate, the temperature rises to from about 100 to about 110° C. with simultaneous increase in viscosity. At this temperature, the viscous melt is poured onto metal sheets and finally heated for approximately 20 hours at about 100° C.

(c) About 100 g. of melted N-di-(β-hydroxyethyl)-m-toluidine are incorporated by stirring at about 70° C. into about 1 kg. of the reaction product obtained according to (a) and thereafter about 182 g. of toluylene diisocyanate are added. After adding about 0.35 cc. of dibutyl-tin dilaurate, the temperature rises to from about 100 to about 110° C. with a simultaneous increase in viscosity. At this temperature, the viscous melt is poured onto sheet metal plates and heated for approximately another 20 hours at about 100° C.

The following mixtures are prepared on the roll stand:

|  | 1b | 1c |
|---|---|---|
| Reaction product according to 1b | 100 |  |
| Reaction product according to 1c |  | 100 |
| Stearic acid | 1 | 1 |
| RAF-carbon black | 30 | 30 |
| Paraformaldehyde | 0.8 | 0.8 |
| p-toluosulphonic acid | 1.0 | 1.0 |

From these mixtures, test sheets are vulcanized for about 30 minutes at about 151° C. (=4 atm. vapor pressure) in the press. The following mechanical values are established with these test sheets.

|  | 1b | 1c |
|---|---|---|
| Tensile strength kg./cm.$^2$ | 113 | 66 |
| Elongation, percent | 415 | 110 |
| Shore hardness: |  |  |
| 20° C | 51 | 71 |
| 75° C | 44 | 67 |
| Elasticity, percent: |  |  |
| 20° C | 22 | 17 |
| 75° C | 43 | 45 |
| Notch toughness kg./cm./4 mm | 7 | 4 |

*Example 2*

(a) About 60 g. of molten 4,4'-di(N-methyl-β-hydroxyethyl amino) diphenyl methane are incorporated by stirring at about 70° C. into about 1 kg. of a polyethylene glycol having an hydroxyl number of 132 and then about 342 g. of 4,4'-diphenyl methane diisocyanate are added. After adding about 0.2 cc. of dibutyl-tin dilaurate, there is a rapid rise in temperature to from about 100 to about 110° C., the melt becoming highly viscous. It is poured onto metal sheets and further heated for about 20 hours at about 100° C.

(b) About 60 g. of molten N-di-β-hydroxylethyl-m-toluidine are incorporated by stirring at about 70° C. into about 1 kg. of the above described polyethylene glycol having an hydroxyl number of 132, and then about 370 g. of 4,4'-diphenyl methane diisocyanate are added. After adding about 0.2 cc. of dibutyl-tin dilaurate, there is a rise in temperature to from about 100 to about 110° C., the melt becoming highly viscous. It is immediately poured onto metal sheets and heated for another 20 hours at about 100° C.

The following mixtures are prepared on a roll stand:

|  | 2a | 2b |
|---|---|---|
| Reaction product according to 2a | 100 |  |
| Reaction product according to 2b |  | 100 |
| Stearic acid | 1 | 1 |
| Highly active, precipitated silica | 40 | 40 |
| Paraformaldehyde | 0.8 | 0.8 |
| p-Toluosulphonic acid | 0.5 | 0.5 |

From these mixtures, test sheets are vulcanized for about 30 minutes at about 151° C. (=4 atm. vapor pressure) in the press. The following mechanical values were established with these test sheets:

|  | 2a | 2b |
|---|---|---|
| Tensile strength, kg./cm.$^2$ | 126 | 56 |
| Elongation, percent | 535 | 160 |
| Shore hardness: |  |  |
| 20° C | 58 | 72 |
| 75° C | 55 | 71 |
| Elasticity, percent: |  |  |
| 20° C | 30 | 27 |
| 75° C | 40 | 43 |
| Notch toughness (kg. abs. 4 mm.) | 15 | 9 |

*Example 3*

(a) About 60 g. of molten 4,4'-di(N-methyl-β-hydroxyethylamino) diphenyl methane are incorporated by stirring into about 1 kg. of a tetrahydrofuran polymer having an hydroxyl number of 41 after careful dehydration at about 130°/12 mm. and then about 138 g. of 4,4'-diphenyl methane diisocyanate are added. After adding about 0.2 cc. of dibutyl-tin dilaurate there is a rise in temperature to from about 100 to about 110° C. The mixture is poured onto metal sheets and further heated for about 20 hours at about 100° C.

(b) Under the conditions indicated under (a), about 1 g. of tetrahydrofuran polymer having an hydroxyl number of 41, about 100 g. of N-di-β-hydroxyethyl-m-toluidine and about 218 g. of 4,4'-diphenyl methane diisocyanate are reacted. From both products, the following mixtures were prepared on the roll stand:

|  | 3a | 3b |
|---|---|---|
| Reaction product according to 3a | 100 |  |
| Reaction product according to 3b |  | 100 |
| Stearic acid | 1 | 1 |
| RAF-carbon black | 30 | 30 |
| Sulphur | 1.5 | 1.5 |
| Mercaptobenzthiazole | 1 | 1 |
| Mercaptobenzthiazyldisulphide | 3 | 3 |
| Zinc oxide | 5 | 5 |

From the mixtures, test sheets are vulcanized at about 151° C. (=4 atm. vapor pressure) in the press. The following mechanical values were established for the test sheets:

|  | 3a | 3b |
|---|---|---|
| Tensile strength (kg./cm.$^2$) | 209 | 250 |
| Elongation, percent | 690 | 630 |
| Shore hardness: |  |  |
| 20° C | 55 | 61 |
| 70° C | 48 | 59 |
| Elasticity, percent: |  |  |
| 20° C | 56 | 48 |
| 70° C | 50 |  |
| Notch toughness (kg. abs. 4 mm.) | 16 | 12 |

The 4,4' - di(n - methyl-β-hydroxyethylamino)-diphenyl methane is obtained by introducing about 2 mols of ethylene oxide at about 140° C. into about 1 mol of molten 4,4' - di - (N-methylamino)-diphenyl methane. Recrystallized from methanol, the reaction product has a melting point of 96° C.

It is of course to be understood that any of the organic compounds containing active hydrogen atoms or organic polyisocyanates may be used throughout the working examples for those specifically set forth therein. Further, any hydroxyl alkylated aromatic amine within the generic formula set forth above may be used throughout the working examples for those specific compounds used therein. In addition, either formaldehyde, a compound liberating formaldehyde to sulfur may be used as the cross linking agent for the hydroxyl terminated storage stable intermediates.

The polyurethane plastics obtained by the process of the present invention are useful in a variety of commercial applications, such as, for example, the preparation of various molded articles and more particularly tires, shoe heels, toys and the like.

Although the invention has been described in considerable detail for the purpose of illustration, it is to be understood that variations can be made by those skilled in the art without departing from the spirit of the invention and scope of the claims.

What is claimed is:

1. A method for the preparation of non-porous elastomeric polyurethanes which comprises preparing an isocyanate modified active hydrogen terminated intermediate by reacting an organic compound containing active hydrogen atoms which are reactive with —NCO groups and a molecular weight of at least 800 with an organic polyisocyanate and an hydroxy alkylated aromatic amine having the formula

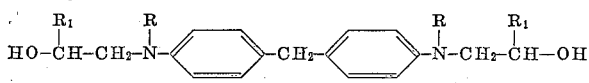

wherein R is a radical selected from the group consisting of alkyl, cycloalkyl and aralkyl and R' is a member selected from the group consisting of hydrogen and alkyl, said active hydrogen terminated compounds being present in an amount in excess of the isocyanate present and reacting the intermediate thus formed with a member selected from the group consisting of formaldehyde and sulfur.

2. Non-porous elastomeric polyurethanes prepared by the process which comprises preparing an isocyanate modified active hydrogen terminated intermediate by reacting an organic compound containing active hydrogen atoms which are reactive with —NCO groups and having a molecular weight of at least 800 with an organic polyisocyanate and an hydroxy alkylated aromatic amine having the formula

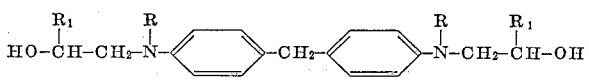

wherein R is a radical selected from the group consisting of alkyl, cycloalkyl and aralkyl and $R_1$ is a member selected from the group consisting of hydrogen and alkyl, said active hydrogen terminated compounds being present in an amount in excess of the isocyanate present and reacting the intermediate thus formed with a member selected from the group consisting of formaldehyde and sulfur.

3. A storage stable active hydrogen terminated intermediate prepared by the process which comprises reacting an organic compound containing active hydrogen atoms which are reactive with —NCO groups and having a molecular weight of at least 800 with an organic polyisocyanate and an hydroxy alkylated aromatic amine having the formula

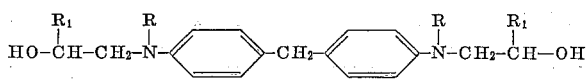

wherein R is a radical selected from the group consisting of alkyl, cycloalkyl and aralkyl and R' is a member selected from the group consisting of hydrogen and alkyl, said organic compound having a molecular weight of at least 800 and said hydroxy alkylated aromatic amine being present in an amount in excess of the isocyanate present.

4. The process of claim 1 wherein the organic compound containing active hydrogen atoms is a polypropylene oxide.

5. The process of claim 1 wherein the organic compound containing active hydrogen atoms is a polyethylene oxide.

6. The process of claim 1 wherein the hydroxy alkylated aromatic amine is present in an amount of from about 1 to about 20% by weight based on the weight of the organic compound containing active hydrogen atoms.

References Cited by the Examiner
UNITED STATES PATENTS

| | | | |
|---|---|---|---|
| 2,615,046 | 10/1959 | Faith | 260—570 |
| 2,877,270 | 3/1959 | Bencze | 260—570 |
| 2,929,800 | 3/1960 | Hill | 260—77.5 |
| 3,043,801 | 7/1962 | Wagner et al. | 260—77.5 XR |
| 3,044,991 | 7/1962 | Muller et al. | 260—75 XR |
| 3,049,514 | 8/1962 | Damusis | 260—77.5 |
| 3,087,912 | 4/1963 | Wagner et al. | 260—77.5 |
| 3,134,755 | 5/1964 | Muller et al. | 260—77.5 XR |

DONALD E. CZAJA, *Primary Examiner.*

LEON J. BERCOVITZ, *Examiner.*

J. J. KLOCKO, *Assistant Examiner.*